(12) United States Patent
Becerra-Novoa et al.

(10) Patent No.: US 8,961,648 B2
(45) Date of Patent: Feb. 24, 2015

(54) INTEGRATED STEEL PLANT WITH PRODUCTION OF HOT OR COLD DRI

(75) Inventors: Jorge Octavio Becerra-Novoa, Nuevo Leon (MX); Ronald Victor Manuel Lopez-Gomez, Nuevo Leon (MX); Alessandro Martinis, Poz-zuolo del Friuli (IT); Andrea Tavano, Tavagnacco (IT)

(73) Assignees: HYL Technologies, S.A. DE C.V., San Nicholas de los Garza, NL (MX); Danieli & C. Officine Mecaniche, S.p.A., Buttrio (IT)

( * ) Notice: Subject to any disclaimer, the term of this patent is extended or adjusted under 35 U.S.C. 154(b) by 145 days.

(21) Appl. No.: 13/319,498

(22) PCT Filed: May 8, 2010

(86) PCT No.: PCT/IB2010/001252
§ 371 (c)(1),
(2), (4) Date: Jan. 23, 2012

(87) PCT Pub. No.: WO2010/128402
PCT Pub. Date: Nov. 11, 2010

(65) Prior Publication Data
US 2012/0125151 A1  May 24, 2012

Related U.S. Application Data

(60) Provisional application No. 61/176,769, filed on May 8, 2009.

(51) Int. Cl.
*C21B 13/12* (2006.01)
*C21B 13/08* (2006.01)
(Continued)

(52) U.S. Cl.
CPC .......... *C21B 13/143* (2013.01); *C21B 13/0086* (2013.01); *C21B 13/02* (2013.01); *F27B 3/18* (2013.01)
USPC ............................................. 75/375; 75/491

(58) Field of Classification Search
USPC .................................................... 75/491, 375
See application file for complete search history.

(56) References Cited

U.S. PATENT DOCUMENTS 5,296,015 A * 3/1994 Becerra-Novoa et al. ... 75/10.66
(Continued)

FOREIGN PATENT DOCUMENTS

EP            0 515 744      12/1992
(Continued)

*Primary Examiner* — George Wyszomierski
*Assistant Examiner* — Tima M McGuthry Banks
(74) *Attorney, Agent, or Firm* — A. Thomas S. Safford; Frommer Lawrence & Haug LLP

(57) ABSTRACT

An integrated steelmaking plant for merging continuous operation of a reduction reactor producing hot DRI with the batch operation of a DRI melting furnace(s). The reactor produces hot DRI for a DRI melting furnace or cold DRI continuously even when the DRI production exceeds the DRI consumption rate of the furnace or suffers long-term operational delays. The reduction reactor has a DRI cooling zone therein which is selectively operable for cooling DRI when the hot DRI produced in the reactor can't all be consumed by the DRI melting furnace and when the capacity of the DRI bin feeding the melting furnace is insufficient to accumulate additional hot DRI. No separate DRI cooling vessel plus its gas compressor and gas cooling-cleaning system is needed, thus decreasing capital and operational costs. This also permits a flexible and modular construction and operation of a steelmaking plant with high or low pressure reduction reactors.

10 Claims, 3 Drawing Sheets

(51) Int. Cl.
*C21B 13/02* (2006.01)
*F27D 11/08* (2006.01)
*F27D 19/00* (2006.01)
*C21B 13/14* (2006.01)
*C21B 13/00* (2006.01)
*F27B 3/18* (2006.01)

(56) References Cited

U.S. PATENT DOCUMENTS 5,447,550 A    9/1995   Leal-Cantu et al.
6,241,804 B1   6/2001   Rosenfellner
7,608,129 B2 * 10/2009  Zendejas-Martinez ......... 75/496

FOREIGN PATENT DOCUMENTS

| JP | 54 084816 | | 7/1979 |
| JP | 61073795 A | * | 4/1986 |
| WO | WO 00/36155 | | 6/2000 |
| WO | WO 2009/037587 | | 3/2009 |
| WO | WO 2009/144521 | | 12/2009 |

* cited by examiner

INTEGRATED STEEL PLANT WITH PRODUCTION OF HOT OR COLD DRI

This application is a national phase of International Patent Application No. PCT/IB2010/001152, filed May 8, 2010, designating the U.S. and published as WO 2010/128402, and claims the benefit of U.S. Provisional Application No. 61/176,769, filed May 8, 2009, under the provisions of 35 USC 119(e) and 37 CFR 1.78.

FIELD OF THE INVENTION

The invention relates to the field of integrated mini-mills having a direct reduction plant for producing direct reduced iron (DRI) which is then melted in electric arc furnaces (EAF) or similar devices for producing molten iron which is in turn used for the production of steel products. More particularly, the invention concerns a reduction system capable of producing hot DRI at high temperature to be melted in electric arc furnaces or hot briquetted, and also cold DRI which may be stored for later use, utilizing the same reduction reactor. The invention allows for a better and more flexible connection between the DRI producer (Direct Reduction Plant) and the DRI user (EAF) inside the mini-mill and an advantageous coordination between the continuous DRI production source and the batch-type melting furnace.

BACKGROUND OF THE INVENTION

Utilization of DRI in the steelmaking industry is expanding and the number of so-called mini-mills, which are steel plants of relatively small and medium production capacity, is increasing. These mini-mills comprise one or more direct reduction plants, wherein DRI is produced from iron ores, and electric arc furnaces (EAF) for melting said DRI and producing liquid iron and steel.

The economic and operational advantages of modern steelmaking mini-mills have been recognized in the prior art and some methods and apparatus have been proposed for rendering the mini-mills facilities more efficient with lower investment and operational costs.

DRI is a solid granular material which is produced by reaction of iron ores (mainly iron oxides) in solid phase with a reducing gas at a high temperature of about 900° C. to about 1100° C. in a reduction reactor with or without a DRI cooling zone. DRI is then melted, preferably in an electric arc furnace, to produce molten iron and transformed into liquid steel. Direct reduction plants typically comprise a continuous moving bed reactor discharging hot or cold DRI.

It is known to produce cold DRI in shaft-type moving bed reactors having an upper reduction zone where iron ore particles, as lumps, pellets or mixtures thereof, are reacted with a reducing gas comprising hydrogen and carbon monoxide fed to said reactors at temperatures in the order from about 800° C. to about 1050° C., whereby the hot DRI is then cooled down in a lower cooling zone to temperatures below 100° C. before it is discharged from the reactor in contact with air. The discharge temperature must be below about 100° C. to prevent the DRI from spontaneously reoxidizing. Such reactors producing cold DRI are described for example, in U.S. Pat. Nos. 3,765,872, 4,046,557 and 4,150,972.

It is also known to produce hot DRI in shaft-type moving bed reactors designed to withstand the high-temperatures of DRI, from about 500° C. to about 1000° C., and to promote a gravity-driven mass flow of solids in the reactor, meaning that solid particles move uniformly through the reduction zone in contact with the reducing gas, thus assuring that all particles are chemically reduced to metallic iron to the same degree. This is important for assuring a uniform good quality of the DRI. Examples of hot DRI reactors are described in U.S. Pat. Nos. 3,799,367; 4,188,022; 4,725,309 and 6,214,086.

Applicants have found the following prior art related to the present invention.

U.S. Pat. No. 6,241,804 to Roselfellner describes a process for producing iron briquettes and/or cold iron sponge. This patent shows a shaft-type moving-bed direct reduction reactor 1 where the hot DRI descending from the reduction zone 2 is cooled down in zone 10 by means of a cooling gas system 13. Cold DRI is discharged at a temperature of 30° C. to 100° C. through the product discharge zone 11. Hot DRI, at a temperature of 600° C. to 1000° C. may be produced by extracting it from zone 16 located below the reduction zone utilizing screw conveyors 17. Hot iron briquetting machines 18 are located close to the screw conveyors 17 for producing iron briquettes and be able to store it. Although the general object of producing both types of products, i.e. cold sponge iron and also hot iron briquettes with the same reduction reactor is addressed in this patent, the proposed reactor has a more complicated design and is intended to produce cold DRI most of the time while the hot iron briquettes production is proposed by exception when the normal cold DRI production must be interrupted. This patent is mute regarding the way the screw conveyors are arranged below the reduction zone, which feature is of major importance considering that normally the solid DRI particles flow downwardly through the reactor to be discharged cold, therefore it is concluded that in practice, the screw conveyors will interfere most of the time with the flow of DRI.

U.S. Pat. No. 6,214,086 to Montague et al. describes a method and apparatus for simultaneously supplying varying proportions of hot and cold DRI from a source of hot DRI for melting, storage, briquetting or transport. The system of this patent uses a gravity transport of the DRI and the production of cold DRI is achieved by cooling the hot DRI in a separate cooling vessel outside the reduction reactor which is intended to produce only hot DRI.

U.S. Pat. Nos. 5,296,015 and 5,445,363 to Becerra-Novoa et al. disclose a method for the pneumatic transport of hot or cold DRI as a means for efficiently handling and transporting hot DRI from a reduction reactor to a variety of points of use of such DRI, for example to a DRI melting furnace, a briquetting machine or a storage bin.

Although the above patents suggest the possibility of cooling down the hot DRI within the reduction reactor by means of circulating a cooling gas through the lower portion of the reduction reactor, these patents however do not provide any of the advantages provided by the present invention when the continuous production of hot DRI in a moving bed shaft-type reactor is integrated with a meltshop utilizing one or more batch-type DRI melting devices, for example electric arc furnaces (EAF).

The current practice in design and operation of DRI-based steelmaking plants having normally hot discharge is to provide a separate DRI cooling vessel for cooling the DRI and then allowing for its discharge to open atmosphere for its safe storage or bulk transport. This separate cooling vessel, however, requires an additional bin for cooling (when a discharge cone already exists in the reactor) with all the associated additional piping and hot product handling equipment needed for access to the remote cooling bin, increases the investment and operational costs of a steelmaking plant.

Documents cited in this text (including the foregoing patents), and all documents cited or referenced in the documents cited in this text, are incorporated herein by reference. Documents incorporated by reference into this text or any teachings therein may be used in the practice of this invention.

The present invention does not require a separate DRI cooling vessel and is intended to provide a direct reduction reactor system designed for a normal production of hot DRI and exceptionally for cooling down said DRI for storage and later utilization, wherein the change of product from hot DRI to cold DRI and vice-versa is smoothly carried out with minimum disturbances in the operation and production of the integrated steelmaking plant.

OBJECTS OF THE INVENTION

It is therefore, an object of the invention to provide a mini-mill steelmaking plant with high efficiency and low operational and investment costs.

It is another object of the invention to provide a system and a method for efficiently merging the continuous operation of a reduction reactor producing hot DRI with the batch operation of an electric-arc furnace for melting said hot DRI.

It is another object of the invention to provide flexibility in a DRI plant design, not restricted by limitations due to restrictions posed by the DRI final user.

It is a further object of the invention to provide the possibility of a modular expansion of the DRI Plant, producing cold DRI at the beginning, and able to be provided in the future with the means needed to produce Hot DRI, using the same equipment already installed and simply adding some new ones.

It is still another object of the invention to provide a direct reduction (DR) reactor system design capable of producing hot DRI or cold DRI with the less equipment.

BRIEF SUMMARY OF THE INVENTION

The present invention concerns a method of operating an integrated steelmaking plant which comprises a direct reduction reactor adapted for producing a normally continuous flow of hot DRI for its consumption in at least one DRI melting furnace and also for discharging cold DRI by providing said reactor with a reduction zone wherein iron ore particles are reduced to hot DRI by reaction with a reducing gas at a temperature of about 850° C. to about 1100° C.; and a DRI cooling zone within the same reactor vessel with a cooling capacity sufficient to cool the output of hot DRI from the reduction zone; at least one or more DRI melting furnaces, at least one or more hot DRI feeding bins, and suitable DRI conduits for conveying said hot DRI from said reduction reactor to such at least one or more DRI feeding bins and then to such at least one or more melting furnaces; and DRI diverting means for selectively directing hot DRI to such at least one or more DRI feeding bins or for separately discharging cold DRI from said reduction reactor; said method comprising: a) feeding said iron ore particles to the reduction zone of said reactor; b) causing said particles to react with a high temperature reducing gas to produce hot DRI; c) determining whether the hot DRI being produced in said reactor upon discharge from said reactor will be able to be consumed by such at least one or more melting furnaces and whether the capacity of such at least one or more hot DRI feeding bins is sufficient to accumulate the amount of hot DRI being discharged while not being consumed by such at least one or more melting furnaces; d) selectively circulating a stream of non-oxidizing cooling gas through said cooling zone of the reactor for cooling said hot DRI from said reducing zone down to a safe overall temperature below about 100° C. when the capacity of such at least one or more hot DRI feeding bins is determined to be insufficient to further accumulate the amount of hot DRI which will not be consumed by such at least one or more melting furnaces; and e) operating said DRI diverting means to separately discharge cold DRI from said reactor when such at least one or more melting furnaces discontinue the normal melting rate and the hot DRI production rate exceeds the capacity of such at least one or more DRI feeding bins.

The present invention further concerns an integrated steelmaking plant for more effectively merging the continuous operation of a reduction reactor for producing hot DRI with the batch operation of at least one or more DRI melting furnaces, which comprises: a direct reduction reactor having in a reducing zone adapted for normally continuous production of hot DRI and also a DRI cooling zone capable of producing cold DRI from the hot DRI received from the reducing zone; at least one or more DRI melting furnaces for consuming DRI produced in said reactor; at least one or more feeding bins for accumulating and batch feeding said at least one or more DRI melting furnaces; characterized by: means for directing hot DRI, received from the reducing zone via the inactive cooling zone, to said one or more melting furnaces, and for separately activating the cooling zone in the reactor and diverting for separate discharge the resulting cold DRI when sensing that the hot DRI produced in said reactor will not be consumed by the DRI melting furnace and that the capacity of any hot DRI feeding bins is insufficient to accumulate the amount of hot DRI which will not be consumed by said melting furnace; whereby a DRI cooling vessel separate from said reactor is not needed.

More preferably, the invention is particularly useful where the reactor is a shaft-type moving-bed reactor and typically with one melting which is an electric arc furnace with pneumatic transport conduits and intermediate DRI disengagement and accumulation bins. It will be understood that the means for diverting may include sensing devices and be computer controlled.

DETAILED DESCRIPTION OF PREFERRED EMBODIMENTS OF THE INVENTION

Utilization of DRI in the steelmaking industry is expanding and the number of so-called mini-mills, which are steel plants of relatively small and medium production capacity, is increasing. These mini-mills comprise one or more direct reduction plants, wherein DRI is produced from iron ores, and electric arc furnaces (EAF) for melting said DRI and producing liquid iron and steel.

The economic and operational advantages of modern steelmaking mini-mills have been recognized in the prior art and some methods and apparatus have been proposed for rendering the mini-mills facilities more efficient with lower investment and operational costs.

DRI is a solid granular material which is produced by reaction of iron ores (mainly iron oxides) in solid phase with a reducing gas at a high temperature on the order of 900° C. to 1100° C. in a reduction reactor with or without a DRI cooling zone. DRI is then melted, preferably in an electric arc furnace, to produce molten iron and transformed into liquid steel. Direct reduction plants typically comprise a continuous moving bed reactor discharging hot or cold. DRI. The term "cold DRI" is applied to DRI discharged at temperatures preferably below about 100° C., and the term "hot DRI" is applied to DRI discharged at temperature typically above about 350° C., e.g. to DRI not cooled down in the reduction reactor. Some of the direct reduction reactors operate at relatively high pressure over atmospheric pressure, e.g. above about 5 bars over atmospheric pressure, and others operate at a lower pressure over atmospheric pressure, e.g. up to about 5 bars, usually at about 2 to 3 bars over atmospheric pressure.

Figure 1:
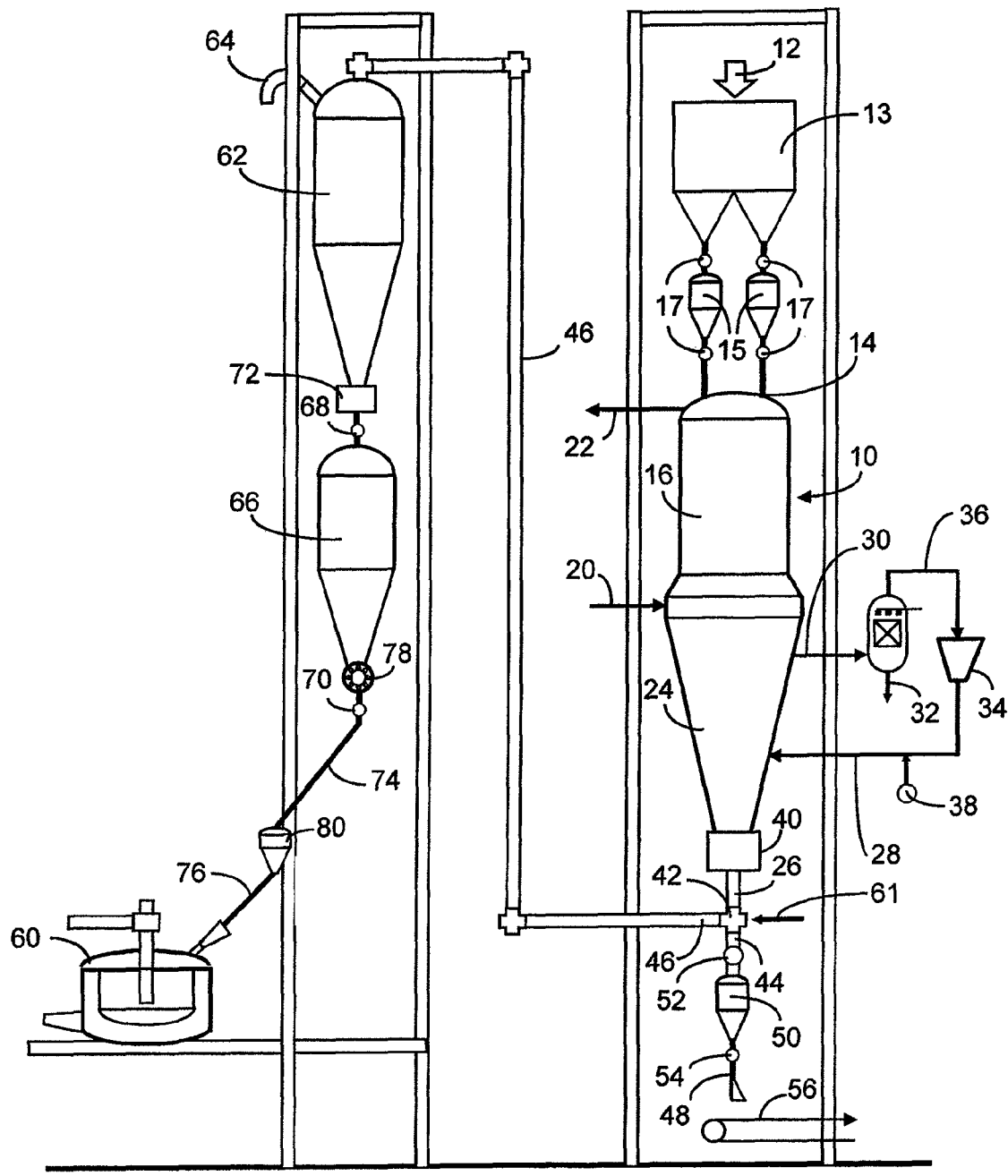
FIG. 1 is a schematic diagram of an integrated steelmaking plant incorporating the invention and showing a direct reduction reactor system for producing hot or cold DRI operating at a relatively high pressure above atmospheric pressure, and a DRI melt-shop having an electric arc furnace with pneumatic transport conduits and intermediate DRI disengagement and accumulation bins.

With reference to FIG. 1, numeral 10 generally designates a direct reduction reactor to which iron ore 12 is fed through at least one inlet 14 in the form of lumps, pellets, or any blend thereof. The iron ore particles 12 are fed from a feed bin 13 to reactor 10 through lockhoppers 15 provided with gas sealing valves 17 as known in the art. The iron ore descends through the reduction zone 16 of reactor 10 and it reacts, in countercurrent contact, with a reducing gas at high temperature. The reducing gas is introduced to the reactor at point 20, located in the lower part of the reduction zone 16, and it is removed from the reactor at point 22 located in the upper part of said reduction zone 16. A major portion of this reducing gas has its reducing potential upgraded and then is recycled back to the reactor 10 at inlet 20, as is well known in the art.

At the lower part of reactor 10 there is a preferably conically shaped discharge section 24, which converges to at least one outlet 26 and through which the already-reduced ore, DRI, is hot or cold discharged.

When the DRI needs to be directly cold discharged (at a temperature below 100° C., to prevent re-oxidation problems that can occur when hot iron sponge comes into contact with atmospheric oxygen and moisture), the lower discharge section 24 is used also as a DRI cooling zone 24. In this DRI cooling zone 24, normally a cooling gas stream (comprising any non-oxidizing, inert, or reducing gas, for example natural gas) is circulated counter-currently to extract heat from the hot DRI. This cooling gas is introduced through pipe 28 at the lower part of conical zone 24, and removed hot from the upper part of the zone 24 through a pipe indicated by 30, and then recycled in a closed circuit back to pipe 28. In the cooling circuit, the hot gas is cleaned and cooled before being reintroduced into the reactor. To this end, the recycling circuit includes a quench tower 32, and a compressor 34 and pipe 36.

A make-up of cooling gas from a suitable source 38 can be fed directly into the lower part of the reactor cone or through a feed point in the cooling circuit.

When it is desired to discharge the DRI at high temperature, which is the norm, the cooling gas loop is shut down, and the DRI does not undergo any kind of active cooling before being discharged from reactor 10.

The DRI is discharged from the reactor 10 at a rate regulated by a device 40 which may be a rotary valve, a vibrating pan, a screw-type conveyor or other means known in the art. The DRI may be selectively sent, by means of diverter valve 42, to conduit 44 if the DRI is already cool, or to conduit 46, if the DRI is hot.

Cold DRI is then discharged through outlet 48 from lockhopper 50, which is pressurized and depressurized by means of gas sealing valves 52 and 54, typically to a cold DRI conveyor 56.

The bin 50, that receives cold DRI from reactor 10 when producing cold DRI, can be used as device for reclaiming samples of DRI for laboratory analysis when the DRI is hot discharged. In this case, a cooling gas is caused to flow through the bin to cool the DRI before filling the sampling bottles.

Hot DRI, produced when the gas cooling circuit in the lower conical zone 24 of the reactor 10 is interrupted, is diverted to an EAF 60, for example by means of pneumatic transport pipe 46 and associated carrier gas system (not shown for simplicity). The invention is not limited to the utilization of pneumatic transport, and the transportation of hot DRI may be made by other conveying means, for example by closed metallic conveyors, or by gravity through pipes with provisions to exclude contact of hot DRI with oxygen and moisture.

A carrier gas stream 61, caused to circulate through duct 46, pneumatically conveys the hot DRI to a bin 62. This bin 62 is used to disengage the carrier gas 61 (that can be for example nitrogen or any non-oxidizing process gas) from the solid particles by a simple expansion of the flow area.

In a preferred embodiment of the invention, hot nitrogen is used as carrier gas 61 which is recycled in a closed circuit. The carrier gas stream, after it has been separated from DRI in receiving bin 62, flows through outlet 64 and is cleaned and cooled down before being compressed and recycled to the transport pipe 46. The carrier gas stream 61 may be heated in order to minimize temperature losses of the hot DRI.

The hot DRI, after separation from the carrier gas 61 used in its pneumatic transport, passes to a second bin 66 which can be used as a lockhopper for discharging hot DRI at atmospheric pressure into the EAF 60. Pressurization and depressurization of the bin 66, is done by means of gas sealing valves 68 and 70. Regulation of solids flow from receiving bin 62 to lockhopper bin 66 is made by means of a solids discharging device 72, for example a rotary valve or the like. The hot DRI is then fed to EAF 60 through conduits 74 and 76 at a controlled rate by a dosifying device 78, for example a rotary valve. Sampling/dosing bin 80 is located above the EAF 60 for convenience and may also be used to feed other materials to the EAF 60.

When an unscheduled shutdown occurs to the EAF 60, the continuous production of DRI in reactor 10 can be maintained, because the hot DRI is cooled within the reactor 10 to be suitable for being discharge to the atmosphere. At this point, knowing the duration of the melt-shop plant stoppage, it is possible to continue DRI production by storing the DRI cold.

For a short EAF shutdown, the reactor working conditions remain unchanged, and the hot DRI being produced is accumulated in bins 62 and 66. When steel production is restored, hot DRI can be immediately discharged again to the EAF.

On the other hand, for a long EAF shutdown, the cooling gas circuit through the reactor discharge zone cone 24 is activated, and the reactor discharge can be temporarily stopped in order to cool down DRI in fixed bed mode until the discharge temperature of the DRI (lower than 100° C.) is reached. Afterwards the normal production rate can be restored with a discharge of diverted now-cold DRI.

The production of cold DRI directly inside the reactor has the advantages of reducing the capital and operational costs and also of improving the product quality because the fines normally resulting as a consequence of the movement of ore and DRI particles inside the reactor, remain distributed among the large DRI particles. Therefore, the heat and mass transfer between the solid particles and the cooling gas is more uniform as compared to the gas-solid contact made with DRI that has been discharged from the reduction reactor 10 and fed into a separate cooling vessel (since the fines segregate when charged to a separate cooling vessel with consequent gas flow irregular disruption).

Another advantage provided by the invention is that maintenance of pneumatic transport circuit can be carried in addition to the EAF out without stopping DRI production from the reactor 10, thereby exploiting the dead times resulting from the steel mill shut down.

When a scheduled shutdown of the EAF occurs, it is possible to plan the cooling of DRI inside the reactor in such a way that when the steel production is stopped, DRI production continues by being discharged from the reactor after being cooled to the right temperature to be safely directly discharged at the atmosphere. During the period required to cool down the DRI in the moving bed inside the conical zone 24 of reactor 10, the material discharged is fed to the EAF with a gradually decreasing temperature. Although partially-cooled DRI is being briefly fed to the EAF during this transition period, this is advantageously offset by the continuous production of DRI throughout the transition to safe discharge of cold DRI to the atmosphere. As a consequence, it is evident that the adaption of a reactor able to produce both hot and cold DRI makes an external cooler vessel unnecessary to run the plant. A configuration without an external cooler vessel is therefore made possible by this invention.

Since unscheduled shutdowns of the steel plant are few in a year, the losses of production associated to these events, i.e. fixed bed cooling within the reactor, requiring a few hours stop of DRI production, are negligible. For this reason, a DRI-based steel mill may be designed and built without a separate DRI external cooler at a lower cost. This configuration is just a bit less flexible but more economic and simpler than the steel plants with an external DRI cooler.

Finally another advantage of the present invention is that it is possible to install and to run the plant in gradual steps, simply adding pieces of equipment which are integrated with others already built.

For example at a first stage, the plant can be equipped only for production of cold discharged DRI.

In a second phase, the pneumatic transport system can be installed in order to move Hot discharged DRI from reactor to EAF. In this case, scheduled shut-downs are controlled by planning the cooling of material inside reactor while unscheduled shut-downs are associated to a limited stop of DRI production for the time required to cool down the DRI.

At the end, should a guaranteed maximum plant flexibility be necessary, an external DRI cooler can be added. In this way, also unscheduled shut-downs can be managed without significant losses of production.

Figure 2:
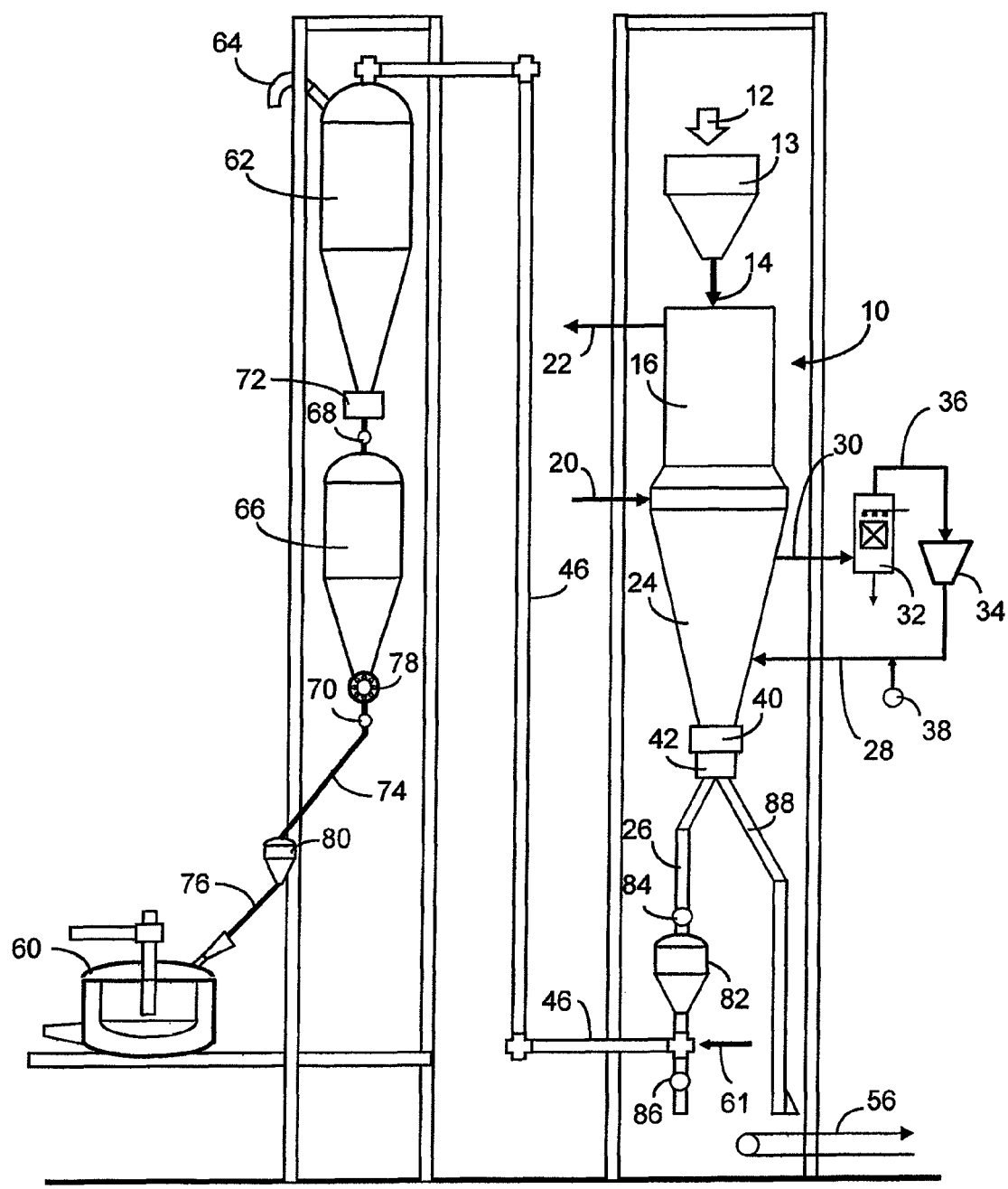
FIG. 2 is a schematic diagram of an integrated steelmaking plant incorporating the invention as applied to a relatively low-pressure direct reduction reactor system for producing hot or cold DRI.

Referring now to FIG. 2, where like numerals designate like elements as in FIG. 1, an embodiment of the invention is shown wherein the reactor 10 does not operate at a relatively high pressure, and therefore, it is necessary to provide an intermediate pressure bin 82 between reactor 10 and pneumatic transport pipe 46 so that the high-pressure carrier gas 61 may be fed to pipe 46. Pressurizable bin 82 is provided with gas sealing valves 84 and 86 for admitting hot DRI from reactor 10 operating at a lower pressure than the pneumatic transport system.

Figure 3:
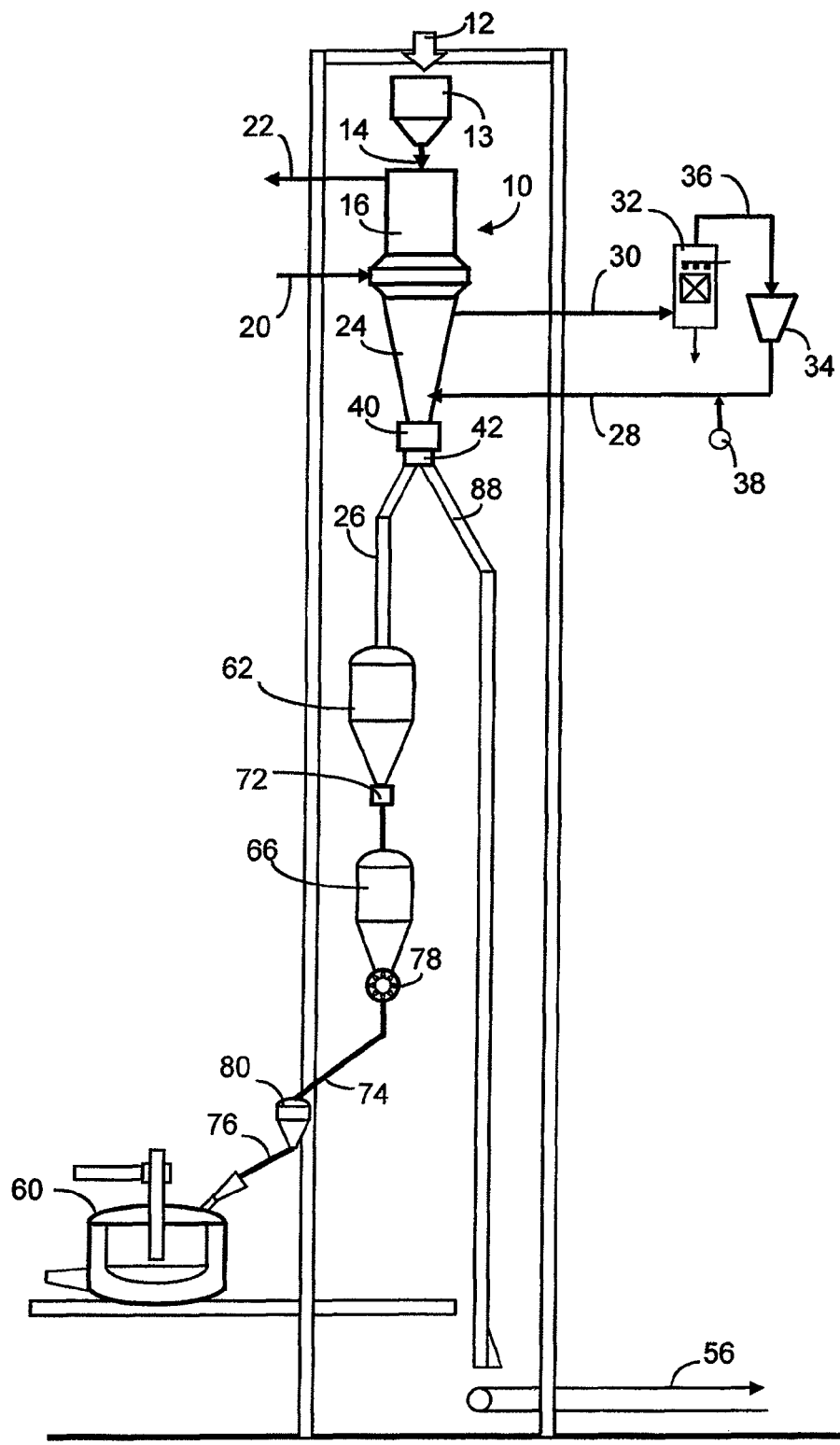
FIG. 3 is a schematic diagram of an integrated steelmaking plant incorporating the invention as applied to a DRI gravity feed melt-shop from a hot or cold DRI producing reactor.

According to another embodiment of the invention, described with reference to FIG. 3, and where like numerals designate like elements as in FIGS. 1 and 2; the direct reduction reactor 10 is located at a suitable height over the EAF 60 level so that it is possible to transport by gravity the hot DRI from the reduction reactor 10 to EAF 60. In this case, when the DRI is cooled inside reactor 10, it is diverted through pipe 88 to cold DRI conveyor 56.

It is of course to be understood that the above descriptions are is for illustrative purposes only, and that these set forth some preferred embodiments of the invention, and that numerous modifications and additions may be made to those embodiments without departing from the spirit and scope of the invention.

What is claimed is:

1. A method of operating an integrated steelmaking plant which plant comprises
   a direct reduction reactor adapted
      for producing a normally continuous flow of hot DRI for its consumption in at least one DRI batch melting furnace and also
      for discharging cold DRI by providing said reactor with
         a reduction zone wherein iron ore particles are reduced to hot DRI by reaction with a reducing gas at a temperature of about 850° C. to about 1100° C.; and
         a DRI cooling zone within the same reactor having a single DRI discharge outlet and having a cooling capacity sufficient to cool the output of hot DRI from the reduction zone;
   at least one or more DRI melting furnaces,
   at least one or more hot DRI feeding bins, and
   suitable DRI conduits for conveying said hot DRI from said reduction reactor
      to such at least one or more DRI batch feeding bins and then
      to such at least one or more melting furnaces; and
   DRI diverting means positioned after the discharge outlet of the cooling zone
      for selectively directing hot DRI to such at least one or more DRI feeding bins or
      for separately discharging cold DRI from said reduction reactor;
   said method comprising:
      a) feeding said iron ore particles to the reduction zone of said reactor;
      b) causing said particles to react with a high temperature reducing gas to produce hot DRI;
      c) directing hot DRI produced in the reduction zone via the cooling zone to said at least one or more melting furnaces, while inactivating cooling in the cooling zone;
      d) determining whether the hot DRI being produced in said reactor upon discharge from said reactor will be able to be consumed by such at least one or more melting furnaces and whether the capacity of such at least one or more hot DRI feeding bins is sufficient to accumulate the amount of hot DRI being discharged while not being consumed by such at least one or more melting furnaces;
      e) separately activating the cooling zone by selectively circulating a stream of non-oxidizing cooling gas through said cooling zone of the reactor for cooling said hot DRI from said reducing zone down to a safe overall temperature below about 100° C. while the capacity of said at least one or more hot DRI feeding bins is determined to be insufficient to further accumulate the amount of hot DRI which will not be consumed by such at least one or more melting furnaces; and
      f) diverting cooled DRI by the diverting means to separately discharge cold DRI from said reactor when batch operation of at least one or more melting furnaces is such hot DRI production exceeds the capacity of such at least one or more DRI feeding bins.

2. A method according to claim 1, wherein said reduction reactor is a shaft-type moving-bed reactor.

3. A method according to claim 2, wherein only one furnace is fed with hot DRI.

4. A method according to claim 3, wherein said cooling gas is natural gas.

5. A method according to claim 3, wherein said cooling gas is a gas derived from coal gasification.

6. A method according to claim 2, wherein said iron ore particles are in the form of lumps, pellets or mixtures thereof.

7. A method according to claim 6, wherein said DRI melting furnace is an electric arc furnace.

8. A method according to claim 7, further comprising operating said reactor at a low pressure of about 2 to 3 bars over atmospheric pressure.

9. A method according to claim 8, wherein the transportation of hot DRI from the reactor to any electric arc furnace is by gravity.

10. A method according to claim 1, wherein transportation of hot DRI from the reactor to any electric arc furnace is by pneumatic transport.

\* \* \* \* \*